United States Patent
Kirsch

(10) Patent No.: US 10,372,938 B2
(45) Date of Patent: Aug. 6, 2019

(54) RESOURCE PROTECTION USING TOKENIZED INFORMATION

(71) Applicant: Cointrust, Inc., Los Altos Hills, CA (US)

(72) Inventor: Steve Kirsch, Palo Alto, CA (US)

(73) Assignee: Token, Inc., Los Altos Hills, CA (US)

( * ) Notice: Subject to any disclaimer, the term of this patent is extended or adjusted under 35 U.S.C. 154(b) by 181 days.

(21) Appl. No.: 15/182,899

(22) Filed: Jun. 15, 2016

(65) Prior Publication Data

US 2016/0294879 A1   Oct. 6, 2016

Related U.S. Application Data

(60) Provisional application No. 62/309,310, filed on Mar. 16, 2016, provisional application No. 62/234,552, filed on Sep. 29, 2015, provisional application No. 62/175,862, filed on Jun. 15, 2015.

(51) Int. Cl.
| | |
|---|---|
| *G06F 17/00* | (2019.01) |
| *H04L 29/06* | (2006.01) |
| *G06F 21/62* | (2013.01) |
| *H04W 12/08* | (2009.01) |

(52) U.S. Cl.
CPC ...... *G06F 21/6245* (2013.01); *H04L 63/0823* (2013.01); *H04L 63/102* (2013.01); *H04W 12/08* (2013.01); *H04L 63/068* (2013.01); *H04L 63/126* (2013.01)

(58) Field of Classification Search
CPC ............. G06F 21/6245; H04L 63/0823; H04L 63/102; H04L 63/068; H04L 63/126; H04W 12/08

USPC ........................................................... 726/1
See application file for complete search history.

(56) References Cited

U.S. PATENT DOCUMENTS

| | | | |
|---|---|---|---|
| 7,363,651 B2 * | 4/2008 | de Jong | H04L 29/06027 726/28 |
| 7,924,709 B2 | 4/2011 | Lynn | |
| 8,051,491 B1 * | 11/2011 | Cavage | G06F 21/6218 707/609 |

(Continued)

OTHER PUBLICATIONS

Miguel Soriano, A Security and Usability Proposal for Mobile Electronic Commerce; IEEE 2002; p. 62-67.*

(Continued)

*Primary Examiner* — Monjur Rahim
(74) *Attorney, Agent, or Firm* — Kilpatrick Townsend & Stockton, LLP

(57) ABSTRACT

A method of using tokens to securely process actions for protected resources may include receiving a request to activate a token associated with a resource with rules governing an action associated with the resource and a signature by a first computer system. The method may also include verifying the signature by the first computer system, and assigning a token identifier to the resource. The method may additionally include receiving the token identifier from a second computer system and a request to perform the action associated with the resource, and determining whether the rules governing the action have been met. The method may further include performing, based on a determination that the one or more rules governing the action have been met, the action associated with the resource.

20 Claims, 9 Drawing Sheets

(56) References Cited

U.S. PATENT DOCUMENTS

| | | | |
|---|---|---|---|
| 8,434,133 B2* | 4/2013 | Kulkarni | G06F 21/33 726/4 |
| 8,656,180 B2 | 2/2014 | Shablygin et al. | |
| 2004/0054915 A1* | 3/2004 | Jong | G06F 21/10 713/193 |
| 2009/0133107 A1* | 5/2009 | Thoursie | H04L 63/0815 726/6 |
| 2013/0036476 A1* | 2/2013 | Roever | H04L 63/08 726/27 |
| 2013/0125223 A1* | 5/2013 | Sorotokin | H04L 9/3213 726/6 |
| 2013/0208893 A1* | 8/2013 | Shablygin | H04L 9/0822 380/277 |
| 2013/0318619 A1* | 11/2013 | Heyner | G06F 21/60 726/26 |
| 2014/0047531 A1* | 2/2014 | Zaitsev | G06F 21/123 726/9 |
| 2014/0075568 A1* | 3/2014 | Sathyadevan | G06F 21/554 726/27 |
| 2014/0344153 A1* | 11/2014 | Raj | G06Q 20/3821 705/44 |
| 2014/0359289 A1* | 12/2014 | Camenisch | H04L 9/0866 713/168 |
| 2015/0032627 A1* | 1/2015 | Dill | G06Q 20/385 705/44 |
| 2015/0046338 A1* | 2/2015 | Laxminarayanan | G06Q 20/38215 705/67 |
| 2015/0112870 A1* | 4/2015 | Nagasundaram | G06Q 20/3821 705/67 |
| 2015/0127547 A1* | 5/2015 | Powell | G06Q 20/382 705/67 |
| 2015/0142673 A1* | 5/2015 | Nelsen | G06Q 20/385 705/76 |
| 2015/0312038 A1* | 10/2015 | Palanisamy | H04L 9/3213 713/155 |
| 2015/0356316 A1* | 12/2015 | Thompson | G06F 21/00 726/28 |
| 2015/0356560 A1* | 12/2015 | Shastry | G06Q 20/401 705/64 |
| 2016/0094541 A1* | 3/2016 | Tan | G06F 21/6218 713/156 |

OTHER PUBLICATIONS

International Search Report and Written Opinion of PCT/US2016/037583, dated Sep. 9, 2016, all pages.

International Preliminary Report on Patentability of PCT/US2016/037583 dated Dec. 28, 2017, all pages.

* cited by examiner

RESOURCE PROTECTION USING TOKENIZED INFORMATION

CROSS-REFERENCES TO RELATED APPLICATIONS

This application claims the benefit of the following U.S. Provisional Applications, each of which is incorporated herein by reference:
   U.S. Provisional Application No. 62/175,862 filed on Jun. 15, 2015, entitled "SECURE TRANSACTION RAIL"
   U.S. Provisional Application No. 62/234,552 filed on Sep. 29, 2015, entitled "ARCHITECTURE FOR GENERATING AND PROCESSING SECURE TOKENS"
   U.S. Provisional Application No. 62/309,310 filed on Mar. 16, 2016, entitled "SMART TOKENIZATION SYSTEM"

BACKGROUND

In the realm of data security, tokenization includes the substitution of a sensitive data element with a non-sensitive counterpart, referred to as a token. The token itself has no extrinsic value, but instead served as a reference that maps back to the sensitive data through a tokenization system.

BRIEF SUMMARY

In some embodiments, a method of using tokens to securely process actions for protected resources may include receiving, at a server, a request to activate a token associated with a resource. The request may include one or more rules governing an action associated with the resource, and a signature by a first computer system. The method may also include verifying, at the server, the signature by the first computer system, and assigning, at the server, a token identifier to the resource. The method may additionally include receiving, at the server, and from a second computer system, the token identifier and a request to perform the action associated with the resource. The method may further include determining whether the one or more rules governing the action have been met, and performing, based on a determination that the one or more rules governing the action have been met, the action associated with the resource.

In some embodiments a non-transitory, computer-readable medium may include instructions that, when executed by one or more processors, cause the one or more processors to perform operations including receiving, at a server, a request to activate a token associated with a resource. The request may include one or more rules governing an action associated with the resource, and a signature by a first computer system. The operations may also include verifying, at the server, the signature by the first computer system, and assigning, at the server, a token identifier to the resource. The operations may additionally include receiving, at the server, and from a second computer system, the token identifier and a request to perform the action associated with the resource. The operations may further include determining whether the one or more rules governing the action have been met, and performing, based on a determination that the one or more rules governing the action have been met, the action associated with the resource.

In some embodiments, a system may include one or more processors and one or more memory devices including instructions that, when executed by the one or more processors, cause the one or more processors to perform operations including receiving, at a server, a request to activate a token associated with a resource. The request may include one or more rules governing an action associated with the resource, and a signature by a first computer system. The operations may also include verifying, at the server, the signature by the first computer system, and assigning, at the server, a token identifier to the resource. The operations may additionally include receiving, at the server, and from a second computer system, the token identifier and a request to perform the action associated with the resource. The operations may further include determining whether the one or more rules governing the action have been met, and performing, based on a determination that the one or more rules governing the action have been met, the action associated with the resource.

In various embodiments, one or more of the following features may be included in any combination and without limitation. The request to activate the token may include the token identifier. The token may include an output numerical string. The request to activate the token may include one or more actions that may be performed using the resource. The request to activate the token may include a public signature associated with the second computer system. The method/operations may also include generating, by the server, the token identifier in response to receiving the request to activate the token. The method/operations may also include storing, at the server, the token identifier, a reference to the resource, and the one or more rules governing the action associated with the resource as an entry in a data structure. The method/operations may also include sending, by the server, the token identifier to the first computer system and not the second computer system. The method/operations may also include sending, by the server, the token identifier to the second computer system and not the first computer system. The method/operations may also include receiving, at the server, and from a second computer system, a signature by the second computer system, and verifying, at the server, the signature by the second computer system. The resource may include personal information of a user of the first computer system. The resource may include a physical asset owned by a user of the first computer system. The one or more rules may include a limitation on the an amount of the resource that may be affected by the action. The one or more rules may include a time window during which the action may be performed. The action associated with the resource may include verifying that information provided by the second computer system about the resource is correct. The action associated with the resource may include transferring at least a portion of the resource to a third computer system. The action associated with the resource may include transmitting at least a portion of the resource to the second computer system. The method/operations may also include determining that at least one of the one or more rules comprises a callout function with a web address, sending the callout function to the web address, and receiving a determination of whether the action can be performed from the web address.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein, are embodiments for governing access and actions that may be performed on a resource using electronic tokens. A server can manage and/or store a protected resource on behalf of a user of a first computer system. In order to grant access to the protected resource, the user of the first computer system can request that a token be generated and associated with the protected resource. The server can store an identifier for the generated token, along with one or more actions that can be performed in association with the protected resource, and/or one or more rules that govern how, when, and if the one or more actions can be performed. The first computer system can then share the token with a second computer system, and by doing so, grant access to the protected resource according to the one or more rules of the electronic token. The second computer system can send the token to the server with a request to perform a specific action using the protected resource. The one or more rules may specify that the server authenticates an identity associated with the second computer system before performing the action.

Figure 1:
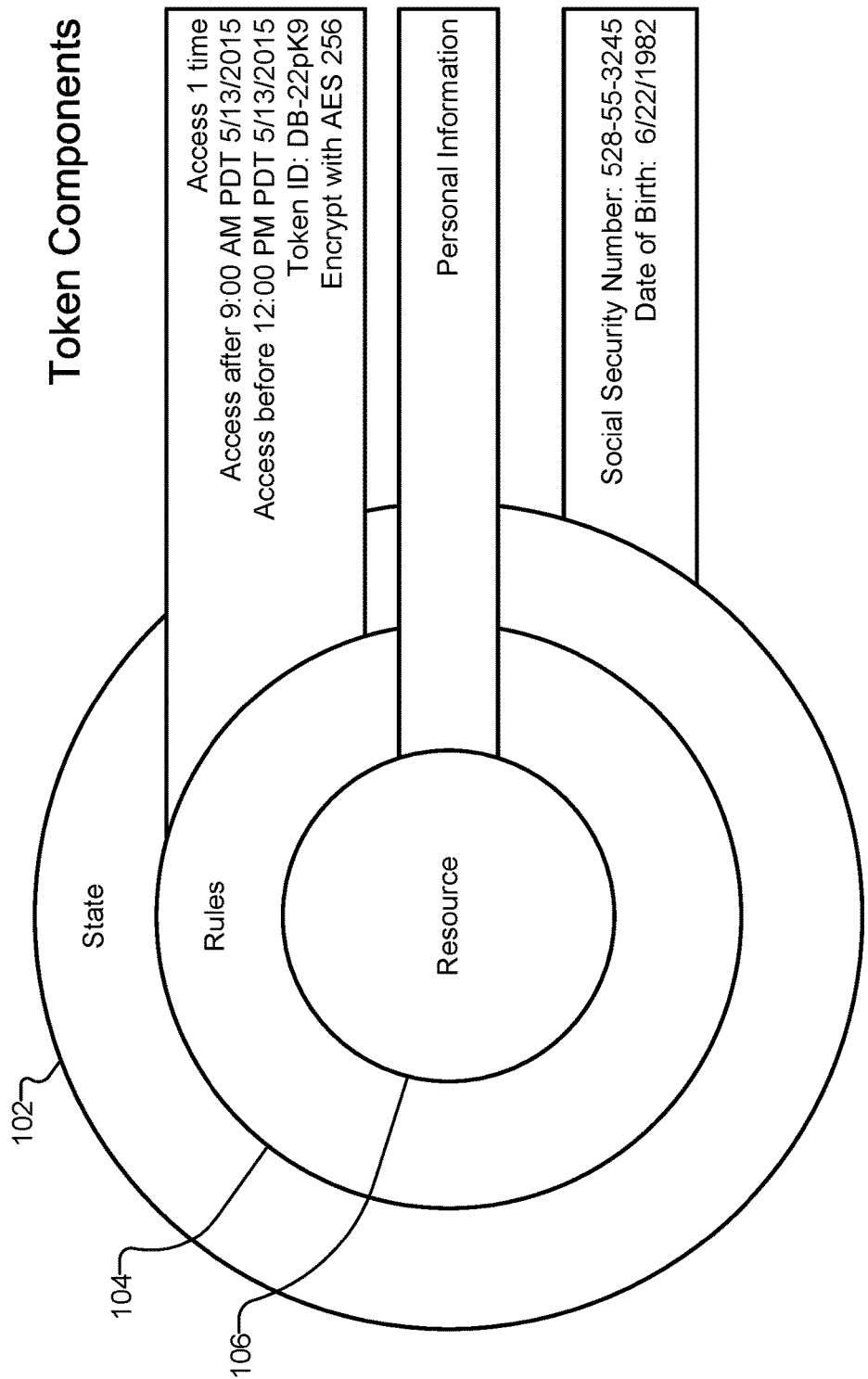
FIG. 1 illustrates an informational diagram for the concept of an electronic token, according to some embodiments.

FIG. 1 illustrates an informational diagram for the concept of an electronic token, according to some embodiments. At the heart of each electronic token is an actual resource. In many cases, the resource includes stored electronic information. For example, the resource 106 may include stored personal information of a user, including Social Security number, date of birth, credit card information, email addresses, passwords, PINs, and so forth. In another example, the resource 106 may include a user account number and/or a current value balance. In another example, the resource 106 may include software programs or other functions that may be executed electronically. In short, the resource 106 may include anything of value that may be stored and/or interacted with electronically in a computer system.

Because the resource is protected by a server that does not necessarily own the resource, rules 104 may be encoded as part of the token definition that govern access and/or actions that may be performed using associated with the resource 106. The rules 104 may include date and/or time windows during which an action may be performed. The rules 104 may also include public signatures to verify the identities of computer systems that are allowed to request that actions be performed on the resource 106. In some embodiments, the rules 104 may include limits on which portions of the resource 106 may be affected by actions requested by a token holder. In some embodiments, the rules 104 may limit the number of times that an action may be performed using the resource 106. The rules 104 may also include expiration and activation dates for the token.

A third component of an electronic token includes an electronic representation of the state 102 of the resource 106. The state 102 may include a historical representation of actions performed on the resource 106. The state 102 may also include numerical values representing amounts or values remaining in the resource 106. The state 102, rules 104, and resource 106 may be stored by a server that manages the resource and generates, issues, and/or activates electronic tokens to be used with the resource 106.

Figure 2:
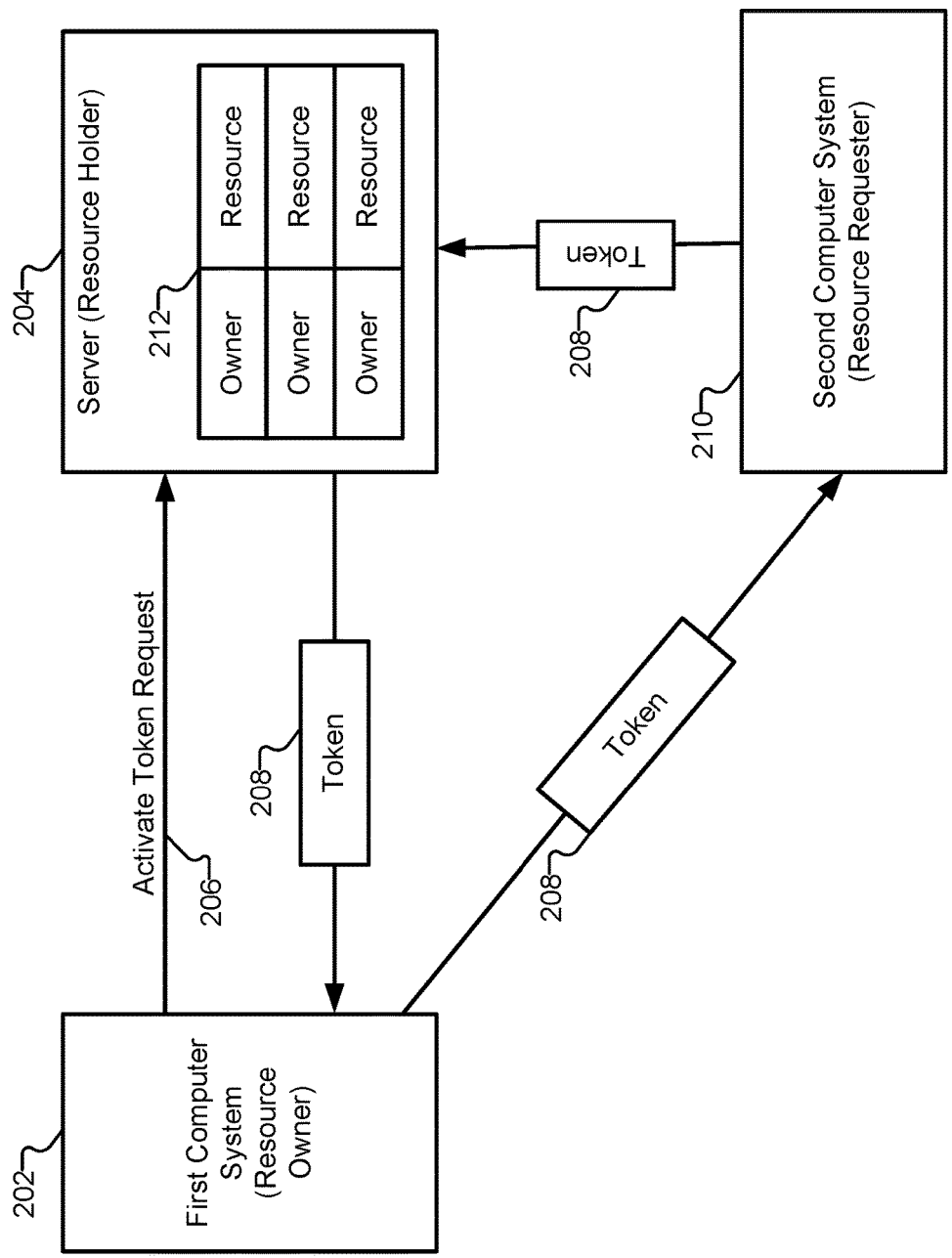
FIG. 2 illustrates a block diagram of systems using an electronic token to perform actions on a resource.

FIG. 2 illustrates a block diagram of systems using an electronic token to perform actions on a resource. The system may involve a first computer system 202 that is used by an owner of the resource. The system may also involve a second computer system 210 that is used by an entity requesting that an action be performed using the resource. The first computer system 202 can send a request to activate the token 206 to the server 204. In some embodiments, the server 204 may store a data structure 212 that catalogs various resources under the control of the server 204, each having an associated owner. To activate the token, the server 204 can assign a token identifier (ID) to a particular resource. In some embodiments, the token ID, also referred to as the token 208, may be transmitted back to the first computer system 202.

The request to activate the token 206 may include one or more rules specified by the first computer system 202 that govern when, how, and/or if actions can be taken on the protected resource assigned to the token. In some embodiments, these rules may replace or be supplemented by default rules that are stored by the server 204. For example, a user of the first computer system 202 may have previously specified that, by default, any tokens activated include an expiration time of 24 hours. The request to activate the token 206 may adjust the default rule to extend the expiration time to 48 hours.

In order to allow other entities to initiate actions associated with the protected resource, the first computer system 202 can share the token 208 with the second computer system 210. The second computer system 210 can send a request to redeem the token 208 to the server 204. The request may include identifying information for the second computer system 210, such as a digital signature. The request may also include a specific action that should be performed by the server 204 using the protected resource. After receiving the token 208, the server 204 can verify an identity associated with the second computer system 210 (if required), verify that the rules associated with the token 208 have been satisfied, and then perform any actions requested by the second computer system 210.

Figure 3:
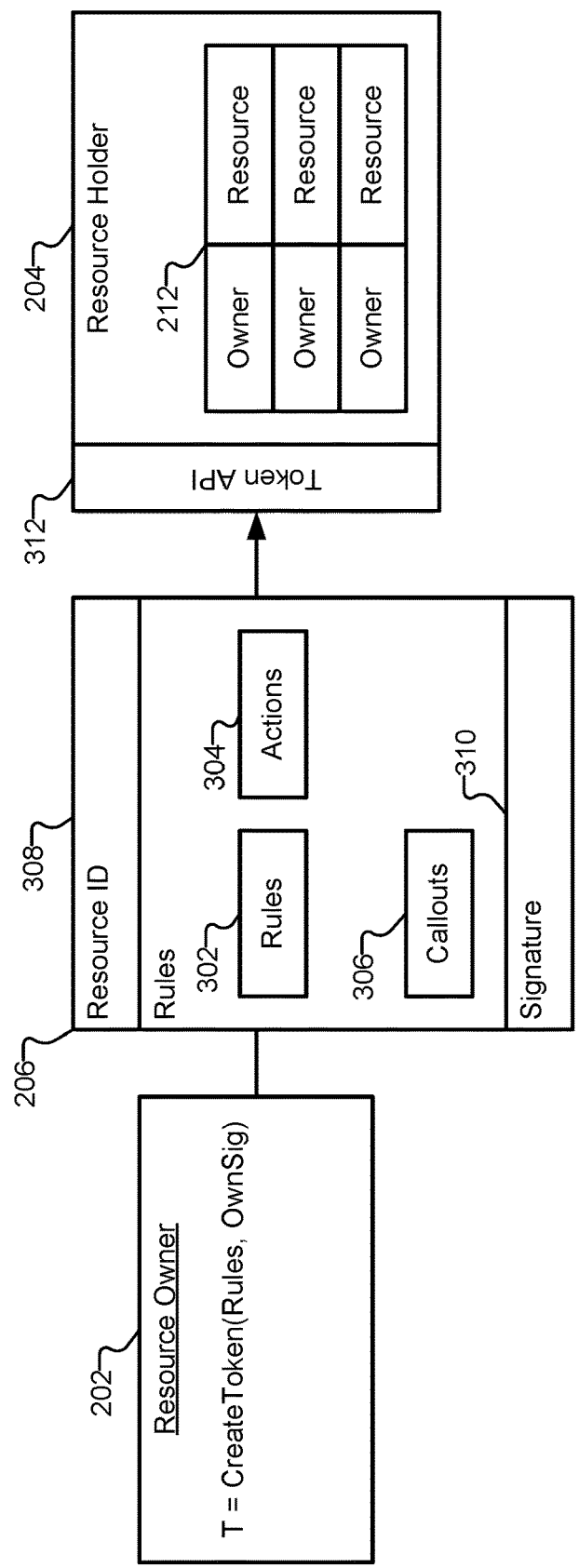
FIG. 3 illustrates a block diagram of a request to activate a token, according to some embodiments.

FIG. 3 illustrates a block diagram of a request to activate a token, according to some embodiments. The server 204 may include a token API 312 that allows other computer systems to activate and redeem tokens. An app or software application running on the first computer system 202 may include a software function (e.g., "CreateToken( )") that automatically sends information to the token API 312 to activate a token. In some embodiments, the CreateToken( ) function may generate an alphanumeric value to represent the token and send the alphanumeric value to the server 204 assigned to the resource. In other embodiments, the server 204 will generate an alphanumeric value to represent the token and send the alphanumeric value back to the first computer system 202.

In order to create a token, information may be provided by the first computer system 202 through the token API 312. In some embodiments, the request to activate the token 206 may include a resource ID 308 that identifies the resource to be associated with the token. In some embodiments, the request to activate the token 206 may include a digital signature 310 provided by the first computer system 202. The digital signature 310 may be provided using a private key, where the server 204 has access to a corresponding public key to authenticate the digital signature 310.

Additionally, the request to activate the token may include one or more actions 304 that may be performed by the server 204 using the resource. In some embodiments, the actions 304 may include verifying that a particular value is stored in the resource. For example, for a resource representing personal information of the user of the first computer system, the second computer system may request that the server verify that the user of the first computer system is at least 21 years old. The action would then return an affirmative response if the age of the user stored in the resource is greater than an age presented by the second computer system for verification. In some embodiments, the actions may include providing access to stored information. In the example above, the second computer system may request a user's Social Security number or email address. The server 204 would extract that information and provided to the second computer system. For each token, the first computer system 202 can specify the specific actions 304 that are granted to a specific user of the token.

In order to regulate the actions 304 specified by the token, the request to activate the token 206 may also include one or more rules 302 that govern when, how, and if the actions are allowed to be executed. Continuing with the example of a resource storing personal information at the server 204, the rules 302 may specify a limited time window during which the personal information may be verified and/or provided. The rules 302 may also specify specific electronic identities that are allowed to access information using the token. For example, the rules 302 may include public keys for recipients of the token. The server 204 would validate signatures on token requests using the public keys in the rules before executing any requested actions. The rules 302 may also include limitations on what can be done with the resource. For example, for a resource that represents a stored value, the rules 302 may dictate how much of that stored value can be moved out of the resource to another resource. In a similar example, the rules may dictate how often portions of the stored value are allowed to be moved out of the resource.

The rules 302 and/or actions 304 may be paired together in any combination. Furthermore, the rules 302 may be arbitrarily complex. In some embodiments, the rules may include one or more callouts 306, or functions, that allow third-party or different computer systems to validate rules. For example, one of the callouts 306 may include a URL (e.g., https://validatemytoken.com), a list of state variables for the resource, and request from the second computer system, which may include the token ID. Some embodiments may also include a public key to verify the request. The server 204 can package the state information and send the packet to the URL. The URL can respond with an indication of whether the rules allow the requested action to take place. By using callouts 306 very complex permissions can be set up outside of the server 204, which can be constantly monitored and/or updated in real-time by a user of the first computer system 202 or any other interested entity with permission.

Figure 4:
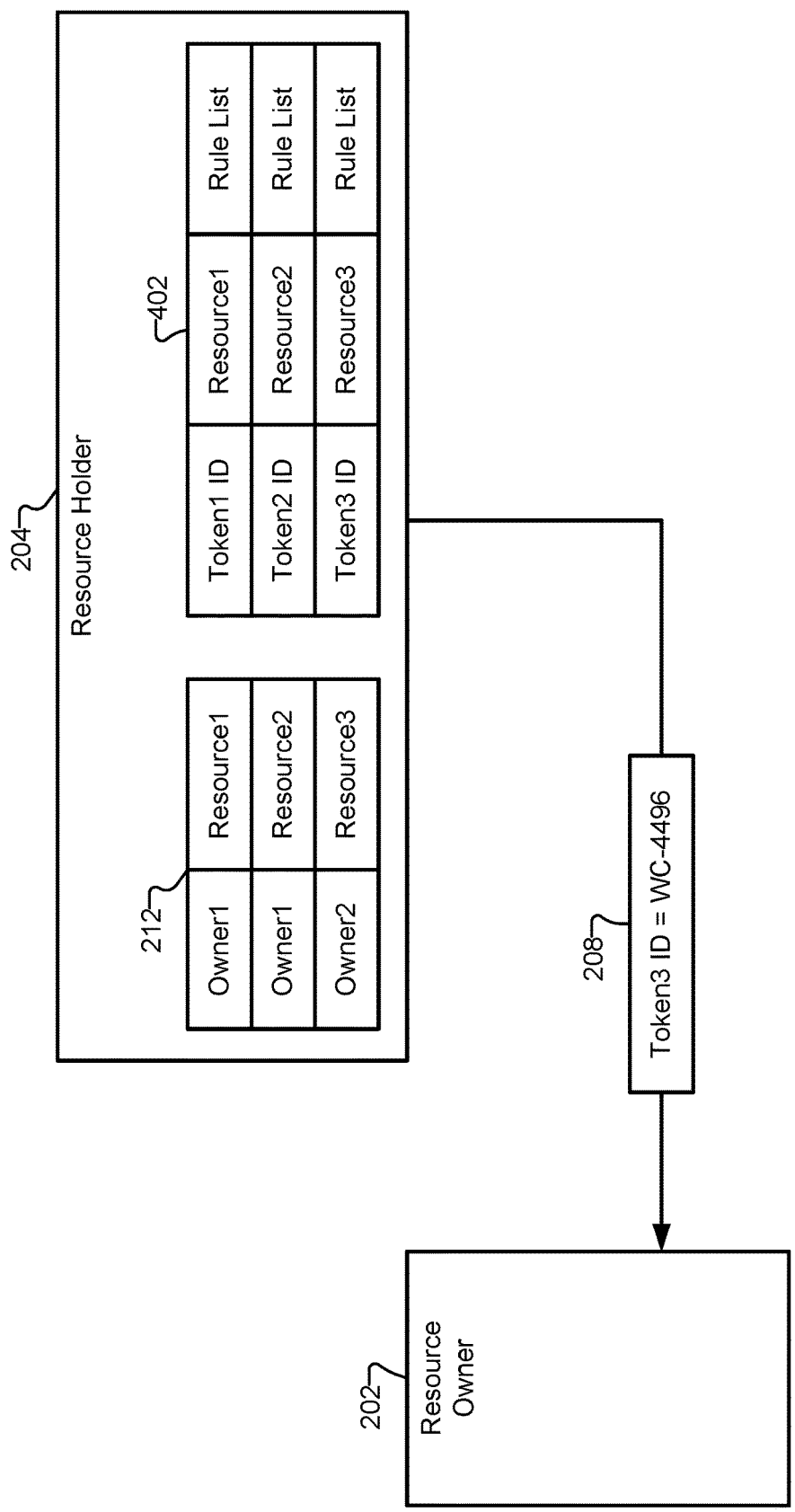
FIG. 4 illustrates the activation of a token by the server 204, according to some embodiments.

FIG. 4 illustrates the activation of a token by the server 204, according to some embodiments. The data structure 212 that stores a pairing between owners and resources may be augmented with the second data structure 402 to store activated tokens. Each entry in data structure 402 may include a token identifier that uniquely identifies an active token, a reference to the resource associated with the token, and a list of rules in the definition of the token. In some embodiments, the data structure 402 may also include a list of actions that may be performed using the resource. In some embodiments, each action may be paired with a specific set of rules in the rule list. When an action request is received as a request to use/redeem a token, the server 204 can look up the rules associated with that particular action for evaluation.

In some embodiments, the token 208 itself can be represented by a simple identifier, such as an alphanumeric string or other digital representation, such as a barcode, QR code, and/or the like. The actual token 208 may be generated by either the first computer system 202 or the server 204. When generated by the first computer system 202, the token 208 can accompany the request to activate the token sent to the server 204. The server 204 can then assign the token 208 to a particular resource and store the rule list in the data structure 402. When generated by the server 204, the server 204 can transmit the token 208 to the first computer system 202 as part of the activation process.

Figure 5:
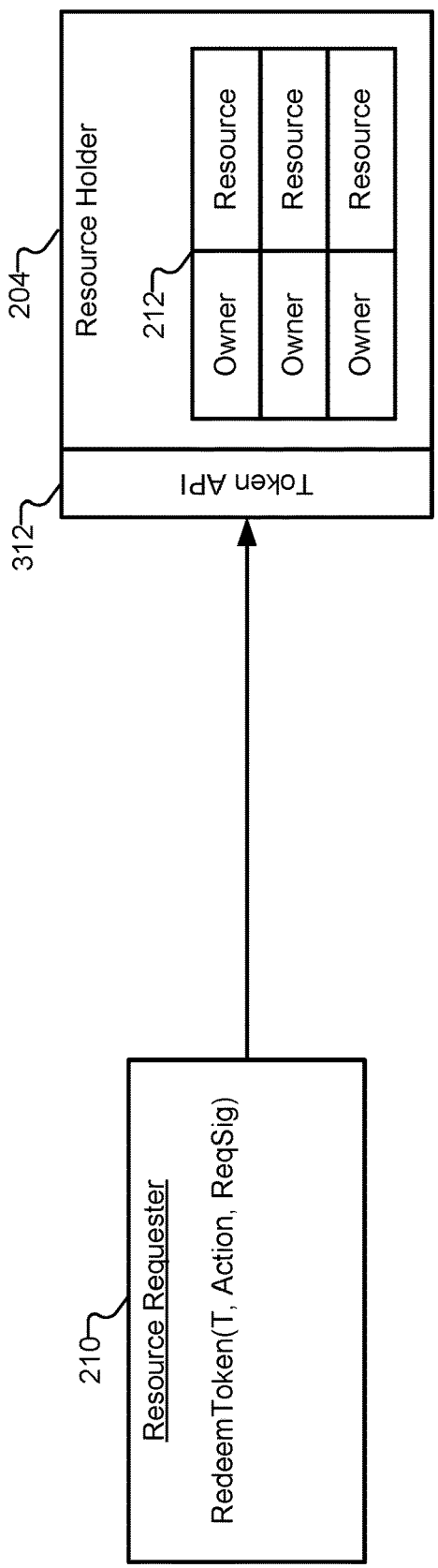
FIG. 5 illustrates a process for redeeming a token from a second computer system 210, according to some embodiments.

FIG. 5 illustrates a process for redeeming a token from a second computer system 210, according to some embodiments. In order to grant access to the resource, the first computer system 202 can transmit the token 208 to the second computer system 210 using any known method. In some embodiments, a user of the first computer system 202 can verbally tell a user of the second computer system 202 the alphanumeric string representing the token 208. In other embodiments, the first computer system 202 can wirelessly transmit the token 208 to the second computer system 210. For example, a transaction between the first computer system 202 and second computer system 210 may include an exchange of information. Instead of exchanging information directly, the first computer system 202 can transmit a token that gives access to the information to the second computer system 210. Transmission of the token 208 may occur automatically using an application or web interface running on the first computer system 202. For example, the server 204 may provide applications or web interfaces that can be executed or accessed by the first computer system 202 and/or the second computer system 210 in order to facilitate processes involving resources held by the server 204.

The token API 312 may include a second function (e.g., "RedeemToken( )") that allows the second computer system 210 to redeem the token after receiving it from the first computer system 202. Arguments in the RedeemToken( )) function may include the token ID and a specific action to be executed associated with the resource. In some embodiments, the function may also transmit a signature provided by the second computer system 210 that can be used to authenticate an identity of a user of the second computer system 210.

Figure 6:
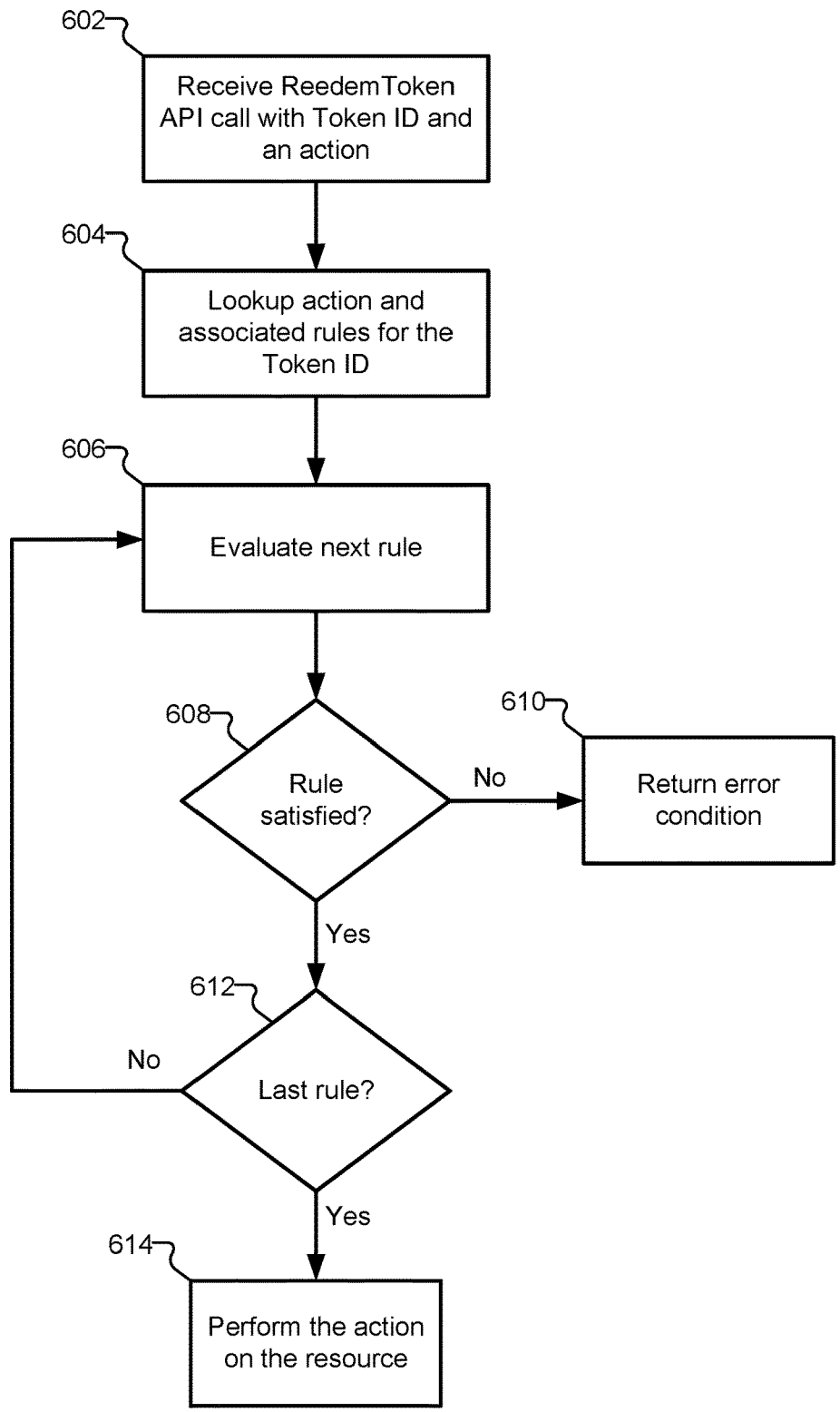
FIG. 6 illustrates a flowchart of a method for redeeming a token, according to some embodiments.

FIG. 6 illustrates a flowchart of a method for redeeming a token, according to some embodiments. The server 204 can receive a RedeemToken( )) API call that includes at least a token ID and an action to be performed using the resource to which the token is assigned (602). After receiving the token, the server can look up the token definition using the token ID in the data structure 402. After locating the token definition, the server 204 can determine whether the action specified in the RedeemToken( )) API call is allowed based on the token. If the action is allowed, the server 204 can identify the specific action and then identify any associated rules that are required in order for that action to be executed (604).

In some embodiments, multiple rules may be chained together using logical AND/OR operations. A single action may have a plurality of rules that must be satisfied before the action can be executed. For each rule associated with the action, the server 204 can evaluate the rule (606). As described above, rules may specify particular identities that are allowed to access/modify the resource, specific time windows during which the action may be performed, amounts of the resource that are allowed to be moved or modified, and so forth. If the conditions of the rule are not satisfied (608), an error message may be returned to the second computer system (610). The same process may be repeated for each rule associated with a particular action. It will be understood that the flowchart in FIG. 6 illustrates an AND relationship between each of the rules, where failing a single rule causes the action to not be executed. Other embodiments (not shown) may additionally or alternatively use an OR relationship, where only a single rule needs to be passed. Other logical operators may also be used to evaluate relationships between rules before executing an action.

When the last rule is successfully evaluated (612), the server 204 can perform the action using the resource (614). In some embodiments, the rules may specify that the token is a single-use-only token. In these embodiments, after performing the action using the resource, the server 204 can delete the token entry from the data structure 402. In this way, any future use of the same token will be met with an error from the server 204.

It should be appreciated that the specific steps illustrated in FIG. 6 provide particular methods of activating/redeeming a token according to various embodiments. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
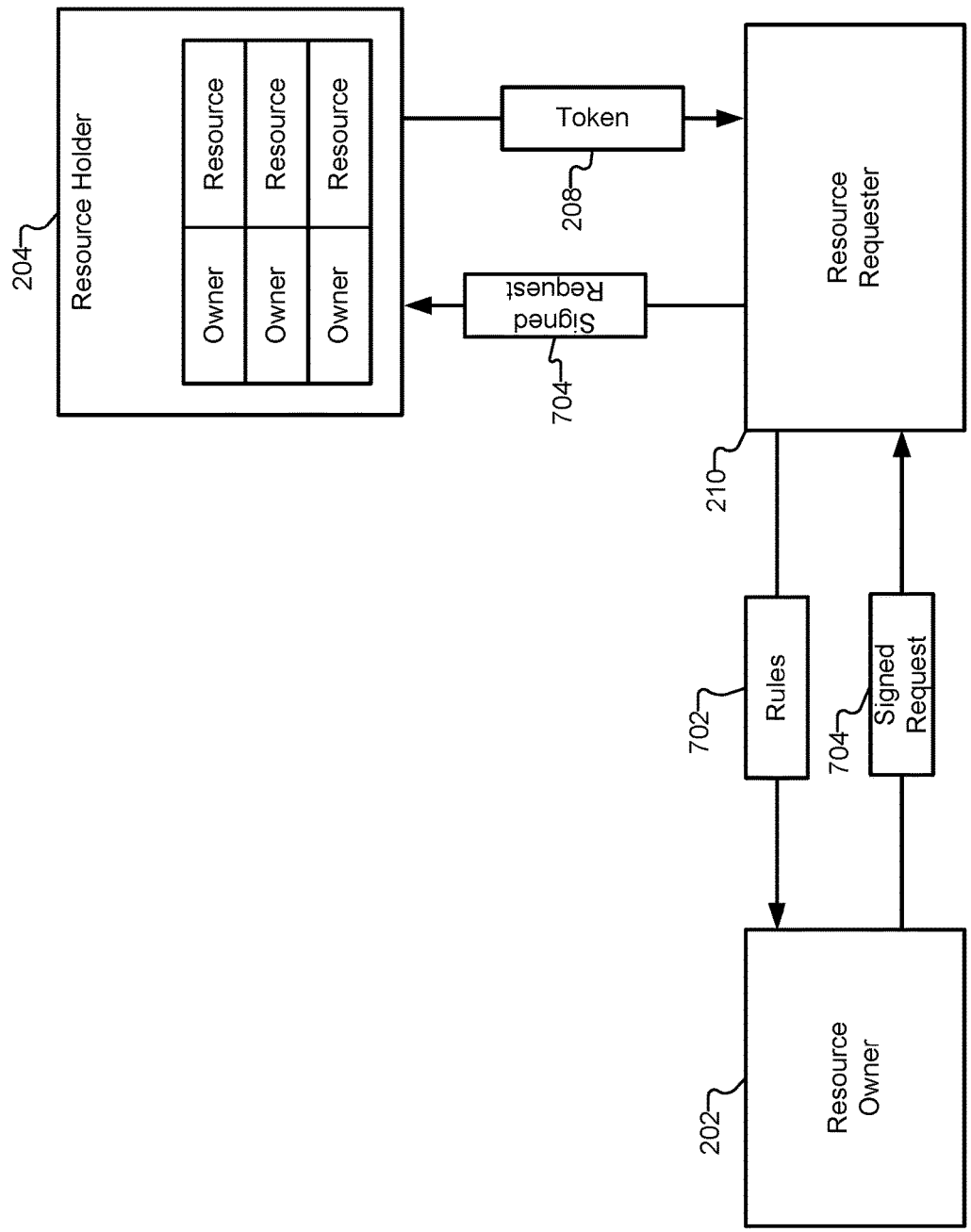
FIG. 7 illustrates a diagram for activating and redeeming a token, according to some embodiments.

FIG. 7 illustrates a diagram for activating and redeeming a token, according to some embodiments. This diagram is similar to the diagram of FIG. 2, except that the rules 702 for the token 208 are primarily designed by the second computer system 210 instead of the first computer system 202. This embodiment may be useful for instances where the second computer system 210 designs the terms of a service or exchange for a customer using the first computer system 202. The rules 702 may include a standard set of rules that are applied to any customer of the second computer system 210.

To begin the transaction, the second computer system 210 can transmit the set of rules 702 to the first computer system 202. In some embodiments, the set of rules 702 may include some data fields that are blank, fields that are completed and locked, and other data fields that can be edited by the first computer system 202. These blank/editable data fields may be populated by the first computer system 202 with values that are specific to a particular operation. For example, the first computer system 202 may fill in an amount, a time window, and/or the like. The first computer system 202 can then sign the set of rules 702 to generate a signed request 704. The second computer system 210 can then forward the signed request 704 to the server 204. In these embodiments, the signed request 704 may be part of a request to activate the token. From the perspective of the server 204, there is no need to differentiate between the situation in FIG. 2 and the situation in FIG. 7. In both cases, the signature on the request originates from the first computer system 202, the only difference being that the second computer system 210 actually submits the request to the server 204 and receives the token 208. In some embodiments, instead of receiving the token 208, the request to activate the token can be combined with a request to redeem the token in a single transmission or set of transmissions from the second computer system 210. In these cases, the token 208 not need to be transmitted back to the second computer system 210. Instead, the server 204 could simply execute the requested action as part of the RedeemToken( ) process.

Figure 8:
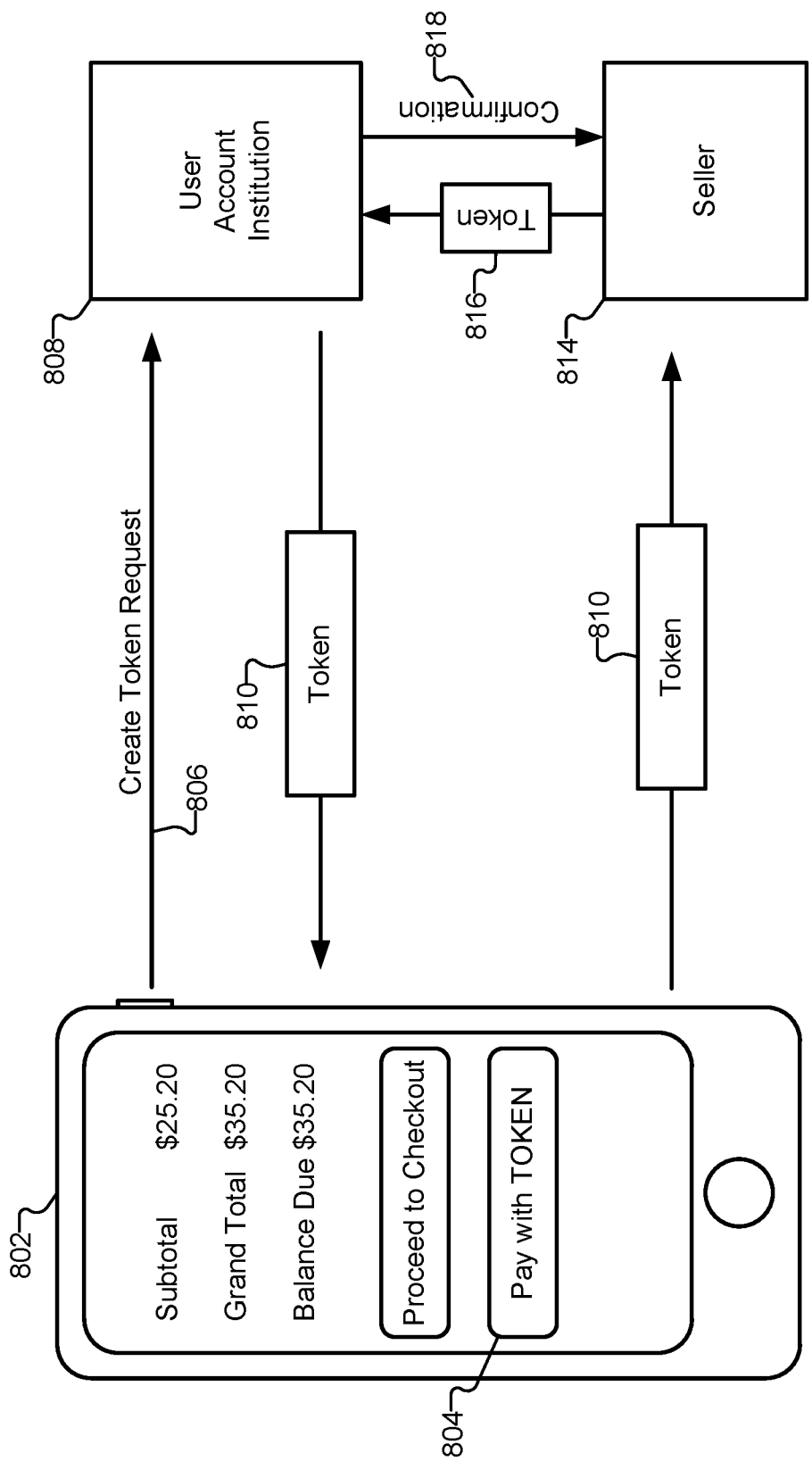
FIG. 8 illustrates one specific application of resource access and protection using smart tokens, according to some embodiments.

FIG. 8 illustrates one specific application of resource access and protection using smart tokens, according to some embodiments. As described above, the embodiments described herein can be applied to many different types of resources and information protection. The resource may include personal information, secret information, executable programs, stored values, and so forth. The specific implantation of FIG. 8 illustrates application of the technology solution described above to a value transfer as part of a transaction. However, it will be understood that this embodiment is merely exemplary and not meant to be limiting. This example simply shows how the technology solution involving servers, APIs, functions, logical rule evaluations, and electronic token activation can be applied to a specific field of application.

The first computing device may include a mobile computing device, such as a smart phone 802. A user of the smart phone 802 may use the smart phone 802 to initiate a transaction from an account of a user account institution 808, such as a bank, to a computer system 814 of the seller. An app running on the smart phone 802 can provide an option to generate/activate a token representing the asset of the user account at the user account institution 808. The user interface of the app can allow the user to set rules for the token, such as a transaction limit, a time window within which the token must be redeemed, the identity of the seller to redeem the token, an account number at the user account institution 808, and so forth. The smart phone 802 can receive input through a user interface element 804 to initiate a create token request 806. The user account institution 808 can receive the request, create/activate the token, and associate the token and rules with the user account.

After the token 810 is activated, the smart phone 802 can transmit the token 810 to the computer device 814 of the seller. This can be done through near-field technology, Wi-Fi, Bluetooth, 3G/4G cellular networks, and so forth. The app on the smart phone 802 can send a create token request 806, receive the token 810, and transmit the token 810 to the computer device 814 of the seller in the background such that the entire transaction is transparent to the user of the smart phone 802. In some embodiments, a user of the smart phone 802 can display an alphanumeric representation of the token to the seller, and the seller can manually enter the alphanumeric representation of the token into the computing device 814 of the seller.

The computer system 814 of the seller can then transmit the token 810 to the user account institution 808, along with a request to perform an action, such as transferring a value amount from the account of the user to a third-party or an account of the seller. The request may also include a signature of the seller such that the user account institution 808 can verify the identity the seller. Once the action is complete, and the value has been transferred, the confirmation 818 can be transmitted to the computing device 814 of the seller.

Each of the methods described herein may be implemented by a special-purpose computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 9:
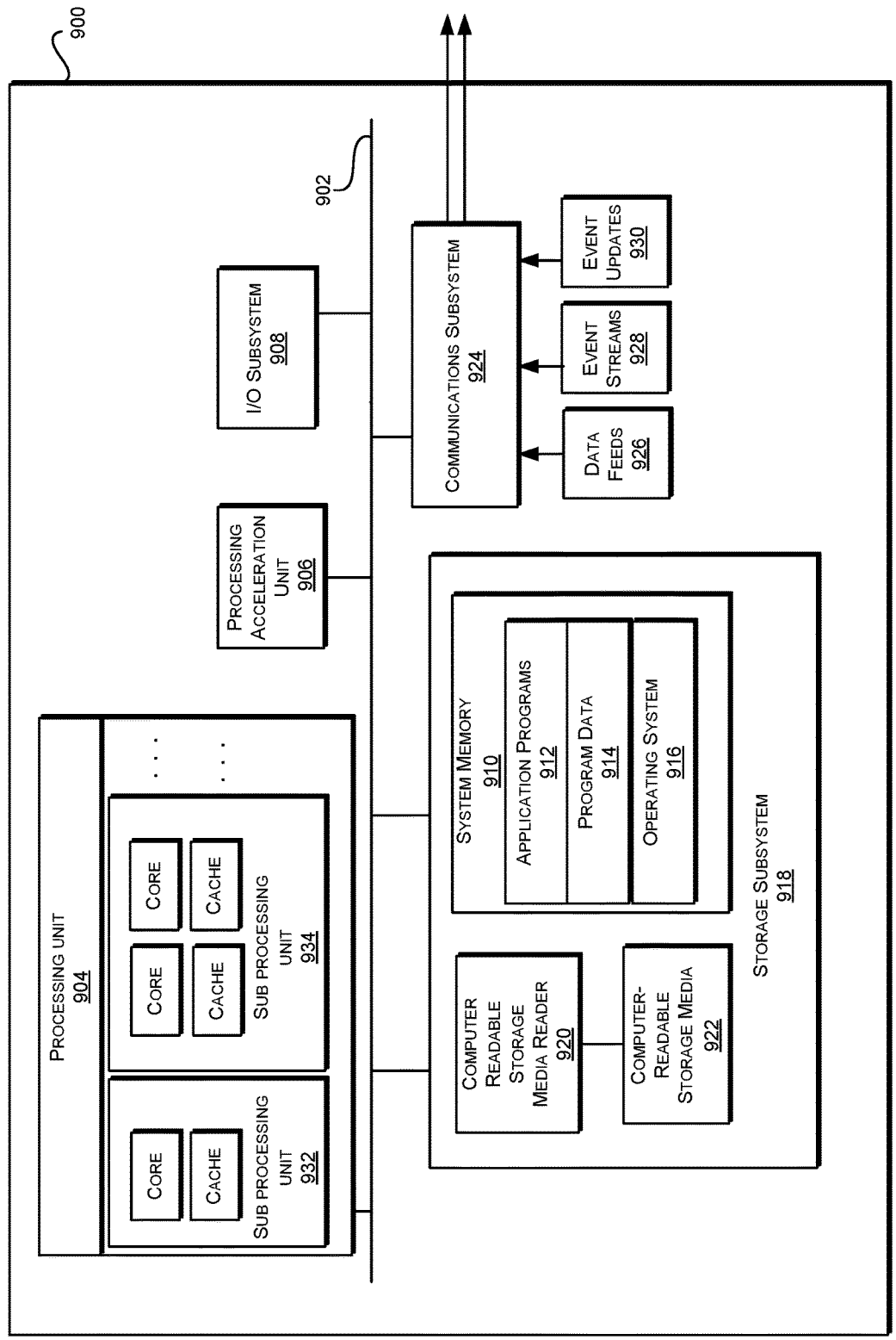
FIG. 9 illustrates an exemplary computer system, in which various embodiments may be implemented.

FIG. 9 illustrates an exemplary computer system 900, in which various embodiments of the present invention may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of using tokens to securely process actions for protected resources, the method comprising:
   receiving, by a hardware processor at a server, a request to activate a token associated with a resource, wherein the request comprises:
   one or more rules governing an action associated with the resource, the one or more rules comprising:

an indication of a computer system that is authorized to request that an action associated with a resource be performed; and characteristics that are specific to a transaction involving a first computer system and a second computer system; and a signature by the first computer system;

verifying, at the server, the signature by the first computer system;

assigning, at the server, a token identifier to the resource;

receiving, at the server, and from the second computer system:

the token identifier; and a request to perform the action associated with the resource;

determining, by the hardware processor at the server, whether the one or more rules governing the action have been met, including verifying that the second computer system comprises the computer system that is authorized to request that the action associated with a resource be performed and verifying that the request to perform the action conforms with the characteristics that are specific to the transaction; and performing, by the hardware processor at the server, and based on a determination that the one or more rules governing the action have been met, the action associated with the resource.

2. The method of claim 1, wherein the request to activate the token further comprises the token identifier.

3. The method of claim 1, wherein the token comprises an output numerical string.

4. The method of claim 1, wherein the request to activate the token further comprises one or more actions that may be performed using the resource.

5. The method of claim 1, wherein the request to activate the token further comprises a public signature associated with the second computer system.

6. The method of claim 1, further comprising generating, by the server, the token identifier in response to receiving the request to activate the token.

7. The method of claim 1, further comprising storing, at the server, the token identifier, a reference to the resource, and the one or more rules governing the action associated with the resource as an entry in a data structure.

8. A non-transitory, computer-readable medium comprising instructions that, when executed by one or more processors, cause the one or more processors to perform operations comprising:

receiving, at a server, a request to activate a token associated with a resource, wherein the request comprises:

one or more rules governing an action associated with the resource, the one or more rules comprising;

an indication of a computer system that is authorized to request that an action associated with a resource be performed; and characteristics that are specific to a transaction involving a first computer system and a second computer system; and a signature by the first computer system;

verifying, at the server, the signature by the first computer system;

assigning, at the server, a token identifier to the resource;

receiving, at the server, and from the second computer system:

the token identifier; and a request to perform the action associated with the resource;

determining whether the one or more rules governing the action have been met, including verifying that the second computer system comprises the computer system that is authorized to request that the action associated with a resource be performed and verifying that the request to perform the action conforms with the characteristics that are specific to the transaction; and performing, by the server, and based on a determination that the one or more rules governing the action have been met, the action associated with the resource.

9. The non-transitory, computer-readable medium according to claim 8, comprising additional instructions that cause the one or more processors to perform additional operations comprising:

sending, by the server, the token identifier to the first computer system and not the second computer system.

10. The non-transitory, computer-readable medium according to claim 8, comprising additional instructions that cause the one or more processors to perform additional operations comprising:

sending, by the server, the token identifier to the second computer system and not the first computer system.

11. The non-transitory, computer-readable medium according to claim 8, comprising additional instructions that cause the one or more processors to perform additional operations comprising:

receiving, at the server, and from a second computer system, a signature by the second computer system; and verifying, at the server, the signature by the second computer system.

12. The non-transitory, computer-readable medium according to claim 8, wherein the resource comprises personal information of a user of the first computer system.

13. The non-transitory, computer-readable medium according to claim 8, wherein the resource comprises a physical asset owned by a user of the first computer system.

14. The non-transitory, computer-readable medium according to claim 8, wherein the one or more rules comprises a limitation on the an amount of the resource that may be affected by the action.

15. A system comprising:

one or more processors; and one or more memory devices comprising instructions that, when executed by the one or more processors, cause the one or more processors to perform operations comprising:

receiving, at a server, a request to activate a token associated with a resource, wherein the request comprises:

one or more rules governing an action associated with the resource, the one or more rules comprising:

an indication of a computer system that is authorized to request that an action associated with a resource be performed; and characteristics that are specific to a transaction involving a first computer system and a second computer system; and a signature by the first computer system;

verifying, at the server, the signature by the first computer system;

assigning, at the server, a token identifier to the resource;

receiving, at the server, and from the second computer system:
  the token identifier; and
  a request to perform the action associated with the resource;
determining whether the one or more rules governing the action have been met, including verifying that the second computer system comprises the computer system that is authorized to request that the action associated with a resource be performed and verifying that the request to perform the action conforms with the characteristics that are specific to the transaction; and
performing, by the server, and based on a determination that the one or more rules governing the action have been met, the action associated with the resource.

16. The system of claim 15 wherein the one or more rules comprises a time window during which the action may be performed.

17. The system of claim 15 wherein the action associated with the resource comprises verifying that information provided by the second computer system about the resource is correct.

18. The system of claim 15 wherein the action associated with the resource comprises transferring at least a portion of the resource to a third computer system.

19. The system of claim 15 wherein the action associated with the resource comprises transmitting at least a portion of the resource to the second computer system.

20. The system of claim 15, wherein the one or more memory devices further comprise additional instructions that cause the one or more processors to perform additional operations comprising:
  determining that at least one of the one or more rules comprises a callout function with a web address;
  sending the callout function to the web address; and
  receiving a determination of whether the action can be performed from the web address.

\* \* \* \* \*